United States Patent
Lewallen

(10) Patent No.: US 7,020,882 B1
(45) Date of Patent: *Mar. 28, 2006

(54) METHOD, SYSTEM, AND PROGRAM FOR REMOTELY MANIPULATING A USER INTERFACE OVER A NETWORK

(75) Inventor: Stephen Richard Lewallen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 389 days.

This patent is subject to a terminal disclaimer.

(21) Appl. No.: 09/662,519

(22) Filed: Sep. 14, 2000

(51) Int. Cl.
*G06F 9/00* (2006.01)

(52) U.S. Cl. ............... 719/328; 719/310; 717/106; 717/136

(58) Field of Classification Search ............... 719/3, 719/310, 328; 345/744, 760; 717/106, 136
See application file for complete search history.

(56) References Cited

U.S. PATENT DOCUMENTS

| | | | |
|---|---|---|---|
| 6,016,392 A | 1/2000 | Jordan | |
| 6,085,030 A * | 7/2000 | Whitehead et al. | 709/203 |
| 6,323,881 B1 * | 11/2001 | Broulik et al. | 345/744 |
| 6,381,735 B1 * | 4/2002 | Hunt | 717/158 |
| 6,404,445 B1 * | 6/2002 | Galea et al. | 345/853 |
| 6,621,505 B1 * | 9/2003 | Beauchamp et al. | 345/764 |
| 6,717,593 B1 * | 4/2004 | Jennings | 715/760 |

OTHER PUBLICATIONS

Robin Cover, "The SGML/XML Web Page", Nov. 1998, p. 1-5.*
Bourret, "FAQ: What software do I need to run XML-DBMS?", Mar. 2000, pp. 1-2.*
Park, "Existing API for DOM", Oct. 1998, p. 1.*
Utriainen, "XML Parsers and XSL Processors", Fall 2000, pp. 1-17.*
VistaEdge, "Using SAX parser", 1998-2004, pp. 1-4.*

(Continued)

*Primary Examiner*—Phuong N. Hoang
(74) *Attorney, Agent, or Firm*—David W. Victor; Konrad, Raynes, & Victor LLP

(57) ABSTRACT

Disclosed is a system, method, and program for generating user interface output on an output device attached to a remote computer. The remote computer communicates over a network to at least one server. The remote computer and server may comprise any computing device known in the art or any appliance or device including an embedded computing device. An object is transmitted to the remote computer including user interface components and data. The remote computer generates user interface output from the user interface components and data in the object. The computer further transmits to the remote computer standard application program interfaces (API) that are a member of a set of standard APIs in a first format. The remote computer converts the standard APIs in the first format to user interface APIs in a second format to manipulate the object and generate further user interface output from the components and data in the object.

30 Claims, 7 Drawing Sheets

OTHER PUBLICATIONS

U.S. Appl. No. 09/568,873, filed May 9, 2000, entitled "Method, System, and Program for Mapping Standard Application Program Interfaces (APIs) to User Interface APIs".

U.S. Appl. No. 09/567,836, filed May 9, 2000, entitled "Method, System, and Program for Mapping Objects in Different Language Formats".

U.S. Appl. No. 09/567,835, filed May 9, 2000, entitled "Method, System, and Program for Using a User Interface Program to Generate a User Interface for an Application Program".

Microsoft Corporation, "The Component Object Model Specification", Version 0.9, Oct. 24, 1995.

J. Robie, "What is the Document Object Model?", Texcel Research, REC-DOM-Level-1-19981001, pp. 1-5, [retrieved on Feb. 7, 2001]. Retrieved from the Internet <URL: http://www.w3.org/TR/REC-DOM-Level-1/introduction.html>.

C. Verbowski, "Integrating Java and COM", Microsoft Corporation, Jan. 1999, pp. 1-10.

Microsoft Corp., "Document Object Model Overview", copyright 2000, pp. 1-10, [retrieved on Feb. 6, 2001]. Retrieved from the Internet <URL: http://www.microsoft.com>.

IBM Corp., "SOMobjects", referring to The System Object Model (SOM) and the Component Object Model (COM), Jul. 7, 1994, pp. 1-5 [orginally retrieved on Feb. 6, 2000, the copy retrieved on Sep. 14, 2001]. Retrieved from the Internet <URL: http://www-4.ibm.com/software/ad/som/library/somvscom.html>.

"QueryInterface", pp. 1-5, [retrieved on May 1, 2001]. Retrieved from the Internet.

"Interface Attributes", pp. 1-2, [retrieved on May 1, 2001]. Retrieved from the Internet.

C. Verbowski, "Using COM Objects from Java", Microsoft, Corporation, Feb. 1999, pp. 1-34.

Microsoft Corp., "The Component Object Model: A Technical Overview", copyright 2000, pp. 1-20, [retrieved on Feb. 6, 2001]. Retrieved from the Internet <URL: http://msdn.microsoft.com/library/techart/msdn_comppr.htm.

I. Kushnirskiy, "Java-to-XPCOM Bridge", Sep. 18, 2000, pp. 1-2, [retrieved on Feb. 7, 2001]. Retrieved from the Internet <URL: http://www.mozilla.org/projects/blackwood/connect/>.

* cited by examiner

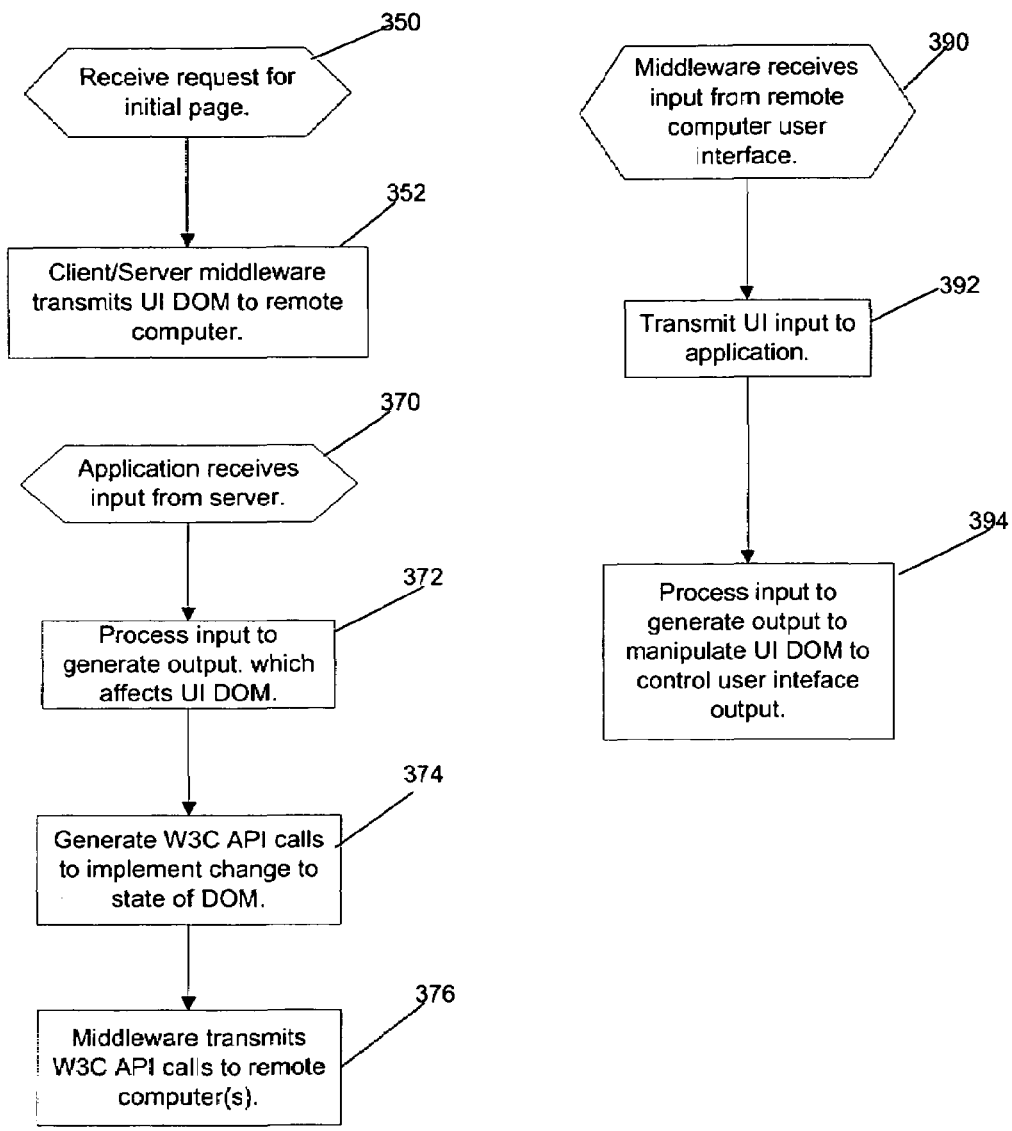

METHOD, SYSTEM, AND PROGRAM FOR REMOTELY MANIPULATING A USER INTERFACE OVER A NETWORK

CROSS-REFERENCE TO RELATED APPLICATIONS

This application is related to the following co-pending and commonly-assigned patent applications, all of which are filed on May 9, 2000, and all of which are incorporated herein by reference in their entirety:

"Method, System, And Program For Mapping Standard Application Program Interfaces (Apis) to User Interface Apis" to Stephen R. Lewallen, having; and Ser. No. 09/568,873.

"Method, System, And Program For Using a User Interface Program to Generate a User Interface for an Application Program" to Stephen R. Lewallen, having; and "Method, System, and Program for Mapping Standard API Interface Sets to Different Operating System Platforms" to Stephen R. Lewallen, having Ser. No. 09/567,836.

BACKGROUND OF THE INVENTION

1. Field of the Invention

Preferred embodiments provide a method, system, and program for using a set of standard application program interface (API) that are adopted as an industry standard, such as the W3C DOM API interfaces, in a cross-platform application program, such as a Java application program.

2. Description of the Related Art

The prior art provides various programs to allow an application on one computer to be remotely controlled from another computer. For instance, the Remote Abstract Window Toolkit (AWT) for Java allows any Java application running on one host to display its GUI components on a remote host and to receive all the events that are posted to its component in the remote host. It allows Java applications to run unchanged in a Client/Server mode. Java applications display and interact with graphical user interface (GUI) components using the Abstract Window Toolkit (AWT). A host AWT would make AWT calls, which are then transported to a remote computer to interface with an executing Java application. In this way, a Java application may execute at a remote location and the GUI components can be provided locally.

Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

The prior art X-protocol also provides distributed computing where an application and a user interface to the application are running on separate machines. The prior art X-protocol defines a client-server relationship. The X server component comprises the software that manages a single screen, keyboard and mouse. A client is an application that displays on the X server and is usually termed an X client or simply the application. The X client sends requests to the X server, for example a drawing or information request. The X server accepts requests from multiple clients and returns to the X client replies for information requests, user input and errors. The X client can issue requests to the X server to control the operation of the GUI interface, the X server can respond to requests from the remote application (X client), and the X server can forward the remote application (X client) an event, such as keyboard or mouse input.

With the Remote AWT network-client system, the user is limited to utilizing the GUI features offered by AWT, which are classes that implement a Java graphical user interface (GUI). One drawback to implementing the GUI in the Java look-and-feel is that the Java look-and-feel is significantly different from the look-and-feel implemented in the native operating system, such as Windows, OS/2, etc. Thus, users running a Java program on a particular operating system platform will have to use the Java GUI interface which differs from the operating system GUI interface to which they are accustomed. These differences can discourage users from adopting Java applications, especially when other application programs, such as those implemented in C++, all use the same native API function calls to implement the native operating system GUI components.

Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

The X protocol is typically utilized for specialized applications running in a private network. Thus, the remote user or client as well as the central server need to implement the X protocol, which requires additional setting up and specialized software. Thus, the X protocol is not suited for operating in open environments, such as the Internet.

Thus, there is a need in the art to allow Java applications to use more commonly used graphical user interface (GUI) components, other than the GUI components offered in Java tool kits, such as AWT. Further, there is a need to provide remote access to applications over an open network, such as the Internet, that does not require the implementation of specialized protocols or software.

SUMMARY OF THE PREFERRED EMBODIMENTS

To overcome the limitations in the prior art described above, preferred embodiments disclose a method, system, and program for generating user interface output on an output device attached to a remote computer. The remote computer communicates over a network to at least one server. The remote computer and server may comprise any computing device known in the art or any appliance or device including an embedded computing device. An object is transmitted to the remote computer including user interface components and data. The remote computer generates user interface output from the user interface components and data in the object. The computer further transmits to the remote computer standard application program interfaces (API) that are a member of a set of standard APIs in a first format. The remote computer converts the standard APIs in the first format to user interface APIs in a second format to manipulate the object and generate further user interface output from the components and data in the object.

In further embodiments, the objects and the standard APIs in the first format are transmitted to multiple remote computers to manipulate the objects on all the remote computers and control the generation of user interface output on the remote computers.

In still further embodiments, the remote computer may receive user input commands and generate user interface APIs in the second format to implement the user input commands. The remote computer would execute the generated user interface APIs to manipulate the object and generate further user interface output from the components and data in the object.

In further embodiments, the user interface output may generate a web browser, the object may comprise a document object model (DOM) object, and the standard APIs in the first format may comprise W3C APIs.

Preferred embodiments provide an architecture for allowing a server or other computer to manipulate the user interface output at a remote computer over a network using standard APIs, such as the W3C APIs. In preferred embodiments, the standard APIs would manipulate an object previously transmitted to the remote computer, such as a DOM object which includes components and data to generate different views of a user interface, such as different views of a subject matter displayed on an HTML page. With the preferred embodiments, a user at the server can control what is displayed at the remote computers without having to transmit the data. Instead, the server need only transmit standard APIs, such as W3C APIs to manipulate the components and data already maintained in the user interface object previously transmitted to the remote computer.

Further, because preferred embodiments are implemented using standard APIs, the developer of the application that generates the standard W3C APIs creates a cross-platform program that operates on any user interface that implements the standard APIs, and thus may control remote user interfaces that implement the DOM and standard W3C APIs. Examples of common user interfaces that implement the DOM include Microsoft's Internet Explorer 4.0 and Mozilla browsers, such as Netscape Communicator

BRIEF DESCRIPTION OF THE DRAWINGS

Referring now to the drawings in which like reference numbers represent corresponding parts throughout:

FIG. 6 illustrates operations performed in a server computer to control the generation of user interface output at a client computer in accordance with preferred embodiments of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
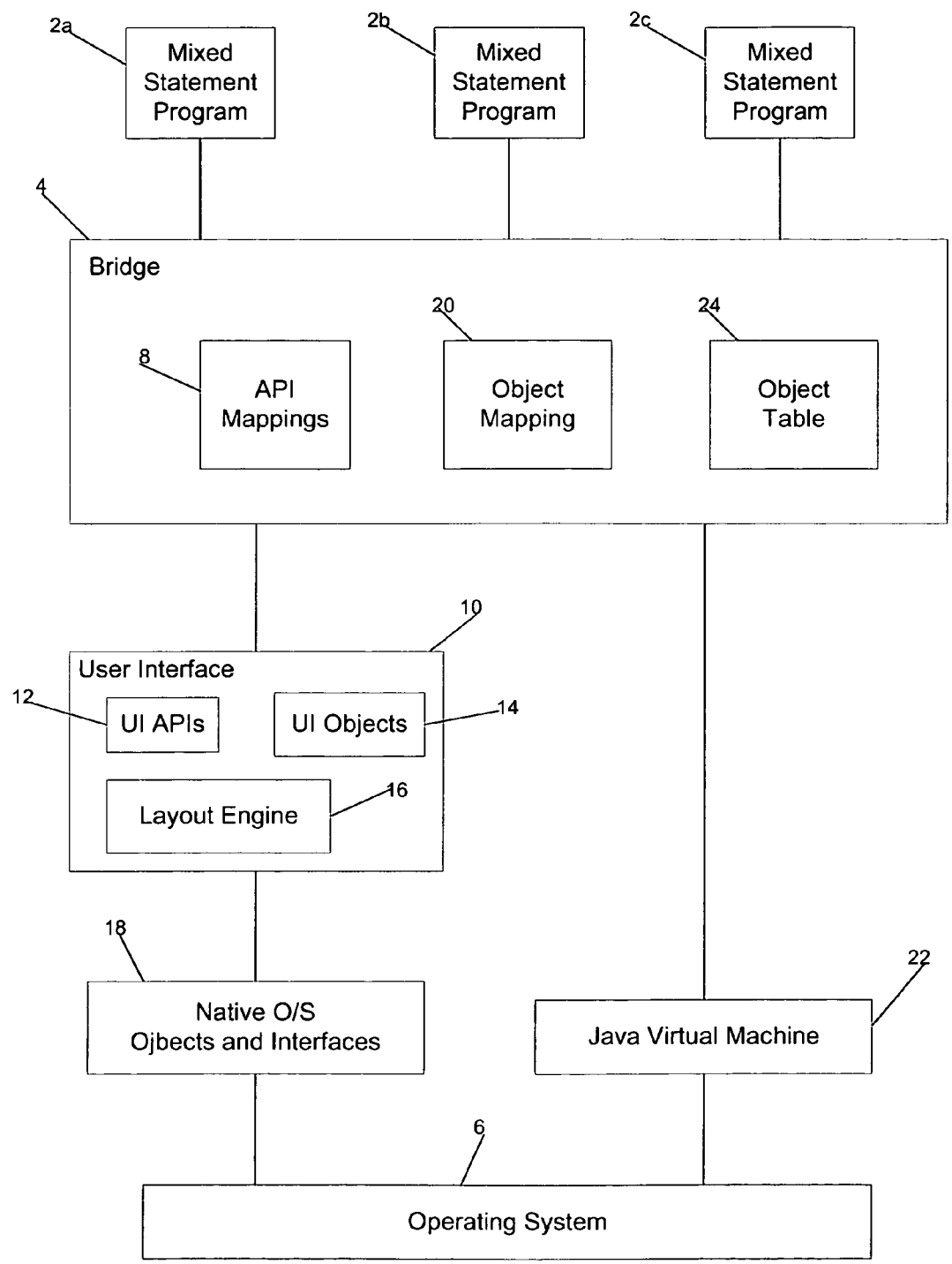
FIG. 1 illustrates elements of the computer architecture in which preferred embodiments are implemented.

FIG. 1 illustrates the components of the computer architecture in which preferred embodiments are implemented. Mixed statement programs 2a, b, c, comprise programs written in the Java programming language, or any other cross-platform language, that may include the standard API interfaces developed by the World Wide Web Consortium (W3C) for the Document Object Model (DOM) application programming interface (API). Thus, these programs 2a, b, c include language statements from different programming languages or protocols, such as Java and non-Java standard API interfaces, such as the W3C API interfaces.

The DOM model is a standard interface used to define the structure of documents, particularly HTML and XML documents. In the DOM specification, the term "document" is used in the broad sense to include the components of a textual document as well as components of an application program. The DOM interface represents the document or application program as a hierarchical arrangement of nodes. All the components of an HTML or XML document, including data as well as program elements, such as the user interface elements, can be expressed as hierarchically arranged nodes. The W3C DOM specifications provide API interfaces to access, change, delete or add nodes to the DOM representation of a document, or application program. The API interfaces specified in the DOM specifications are referred to herein as "W3C API interfaces."

In preferred embodiments, the mixed statement programs 2a, b, c may incorporate the W3C API interfaces of DOM specifications, such as the DOM level 1 Core, including DOM Level 1 HTML, which provides W3C interfaces representing all of the HTML 4.0 elements, DOM Level 2 Core which comprises modifications to DOM Level 1, DOM Level 2 Cascading Style Sheets, etc. Many browsers such as Microsoft Internet Explorer version 5 and Mozilla based browsers, such as Netscape Communicator, implement the W3C DOM Level 1 HTML interface, as well as Cascading Style Sheets. In this way, developers creating mixed statement programs 2a, b, c may utilize the W3C API interfaces as specified in the W3C specifications, such as the "Document Object Model (DOM) Level 1 Specification, Version 1.0" (Oct. 1, 1999) and "Document Object Model (DOM) Level 2 Specification, Version 1.0" (Dec. 10, 1999), which are incorporated herein by reference in their entirety, and which include the DOM Level 1 HTML, DOM Level 2 Core, DOM Level 2 CSS, DOM Level 2 Views and Events, DOM Level 2 HTML, DOM Level 2 Stylesheets, DOM Level 2 CSS, DOM Level 2 Traversal, etc.

After the mixed statement programs 2a, b, c are written to include Java programming language statements as well as W3C API interface calls, the mixed statement program 2a, b, c is processed by a bridge 4. The bridge 4 maintains an API mapping 8 of W3C API interfaces to the corresponding implementation of the W3C API interface in a user interface (UI) program 10 that implements the DOM, such as Internet Explorer, Netscape Communicator and Navigator, Mozilla, the Scalable Vector Graphics format used by Adobe Systems, Inc., or any other user interface that implements the DOM.

The user interface program 10 includes user interface (UI) APIs 12 that are used to manipulate user interface (UI) objects 14 that implement the elements and components of the observable user interface features produced by the user interface program 10. A user interface layout engine 16 would transform the UI APIs 12 and UI objects 14 to the native operating system objects and interfaces 18 on which the browser layout engine 16 was written to operate. For instance, Internet browsers, such as Internet Explorer and Netscape Navigator, include different layout engines for different operating systems to transform the user interface APIs 12 and objects 14 to native operating systems objects and interfaces 18. The browser layout engine has all the mappings to access and control the native operating system. The Mozilla browser layout engine, referred to as the Next Generation Layout (NGLayout) or Gecko layout engine, processes the API functions that implement the W3C DOM Level 0, Level 1, and Level 1 HTML, as well as cascading style sheets and other DOM standards, and generates the native operating system calls to execute the requested operation.

The bridge 4 API mapping 8 would include for each supported W3C API interface, the corresponding UI API 12 interface in the user interface program 10. In preferred embodiments, the API mapping 8 would map the Java class names to the unique identifiers of the user interface APIs 12. The user interface APIs 12 would in turn manipulate browser objects, such as browser COM objects.

The bridge 4 further includes an object mapping 20 of Java objects, that may be called from within the mixed statement programs 2a, b, c. The mixed statement programs 2a, b, c would include a W3C API interface call to a Java object, which maps to a corresponding UI COM object 14 in the user interface 10. The mixed statement programs 2a, b, c may include W3C API calls instantiating and manipulating Java objects, that map to UI objects 14 in the user interface 10. For instance, the object mapping 10 for Internet Explorer describes the mapping of Java objects to COM objects, whereas for Mozilla based browsers the mapping 10 is to XPCOM objects in the Mozilla browser. The bridge 4 uses the API 8 and object 20 mappings to transform W3C API interfaces in the mixed statement programs 2a, b, c to the corresponding user interface APIs 12 and objects 14 that can be executed directly by the user interface layout engine 16, which would then access the underlying operating system interfaces and objects 18 to execute the action. The bridge 4 will forward Java language statements to a Java Virtual Machine (JVM) 22 to process. Thus, in preferred embodiments, the bridge 4 separately processes the Java language statements to generate bytecodes executable by the native operating system and separately processes the W3C API interfaces to produce language statements and object code that the user interface 10 can directly execute.

The W3C API interfaces include numerous methods to implement objects in the user interface 10. By exposing a Java program, or mixed statement programs 2a, b, c, to the W3C API interfaces, a mixed statement program 2a, b, c including Java program statements can access any user interface feature and object that the user interface program 10 is capable of implementing. Thus, with the preferred computer architecture, the Java program is no longer constrained to the Java programming space, and may extend the Java program to other objects and programs available in commonly used user interface programs. For instance, the mixed statement programs 2a, b, c may include the W3C HTML API interfaces to implement a user interface using the underlying UI objects 14 supported in the user interface 10. With this approach, the mixed statement programs 2a, b, c can generate a user interface that has the same look-and-feel as the commonly used user interface 10 with which the user is intimately familiar.

Because the bridge 4 maps to user interface APIs 12, the mixed statement programs 2a, b, c may execute on any operating system on which the user interface 10 may execute. The user interface layout engine 16 will handle the conversion of the browser APIs 12 and objects 14 to the specific operating system 6 platform.

Figure 2:
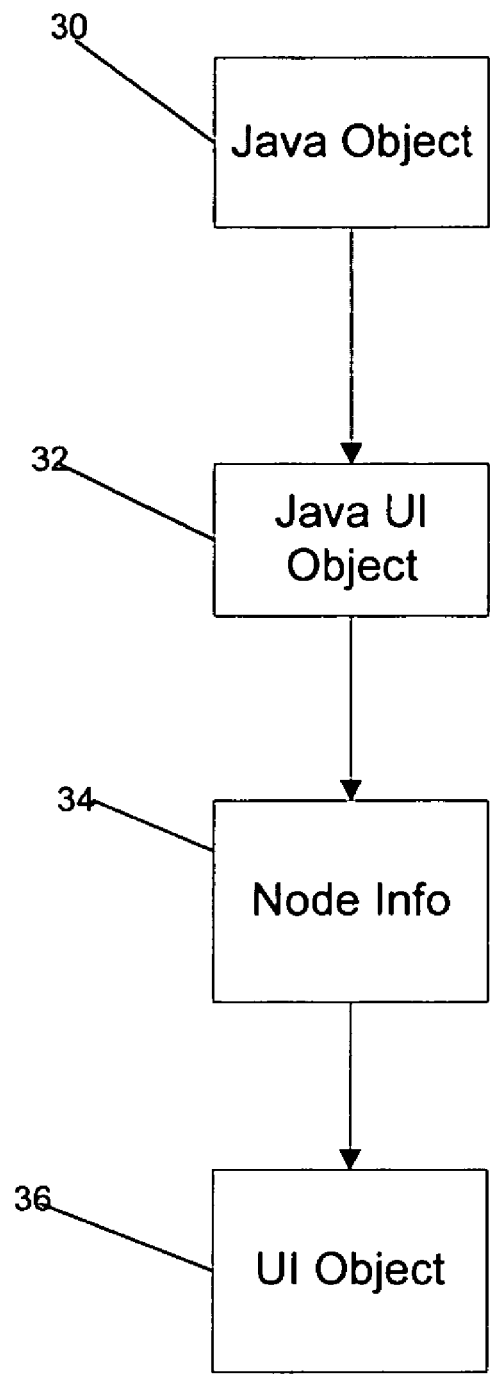
FIG. 2 illustrates data structures used to link a Java object to a user interface object in accordance with preferred embodiments of the present invention.

As discussed the object mapping 20 exposes user interface objects 14 to the mixed statement programs 2a, b, c to provide Java applications access to the user interface 10 functions and elements. The object mapping 20 provides a linkage of an instance of a user interface object 14, e.g., COM object, XPCOM object, etc., to a corresponding Java object that may be manipulated by the mixed statement program 2a, b, c. When a W3C API interface is used in a mixed statement program 2a, b, c to instantiate an instance of a Java object that corresponds to a native operating system object, the Bridge 4 would generate the Java native object 32 and node info object 34 data structures illustrated in FIG. 2 to provide a linkage between the Java object 30 and the corresponding user interface (UI) object 36. The node info object 34 comprises a pointer to the instantiated UI object 36. The Java native object 32 has a pointer to the node info object 34. The Java object 30 inherits all the properties of the Java native object class and can access all the functions implemented in the Java native object class. In this way, the Java object 30 is bound to the corresponding UI object 36 through the Java native object 32 and the methods that allow the Java object 30 to access the node info object 34, which can then be used to access the UI object 36.

In preferred embodiments, the bridge 4 maintains an object table 24 (FIG. 1), which includes the value of the pointer for any native operating system object, e.g., COM object, linked to a Java object. The bridge 4 uses the object table 24 to avoid creating multiple instances of the same Java object. If a pointer to a user interface object is listed in the table 24, then the bridge 4 will have the API function calling such object use the already existing instance of the object instead of instantiating an additional instance of the same object.

Figure 3A:
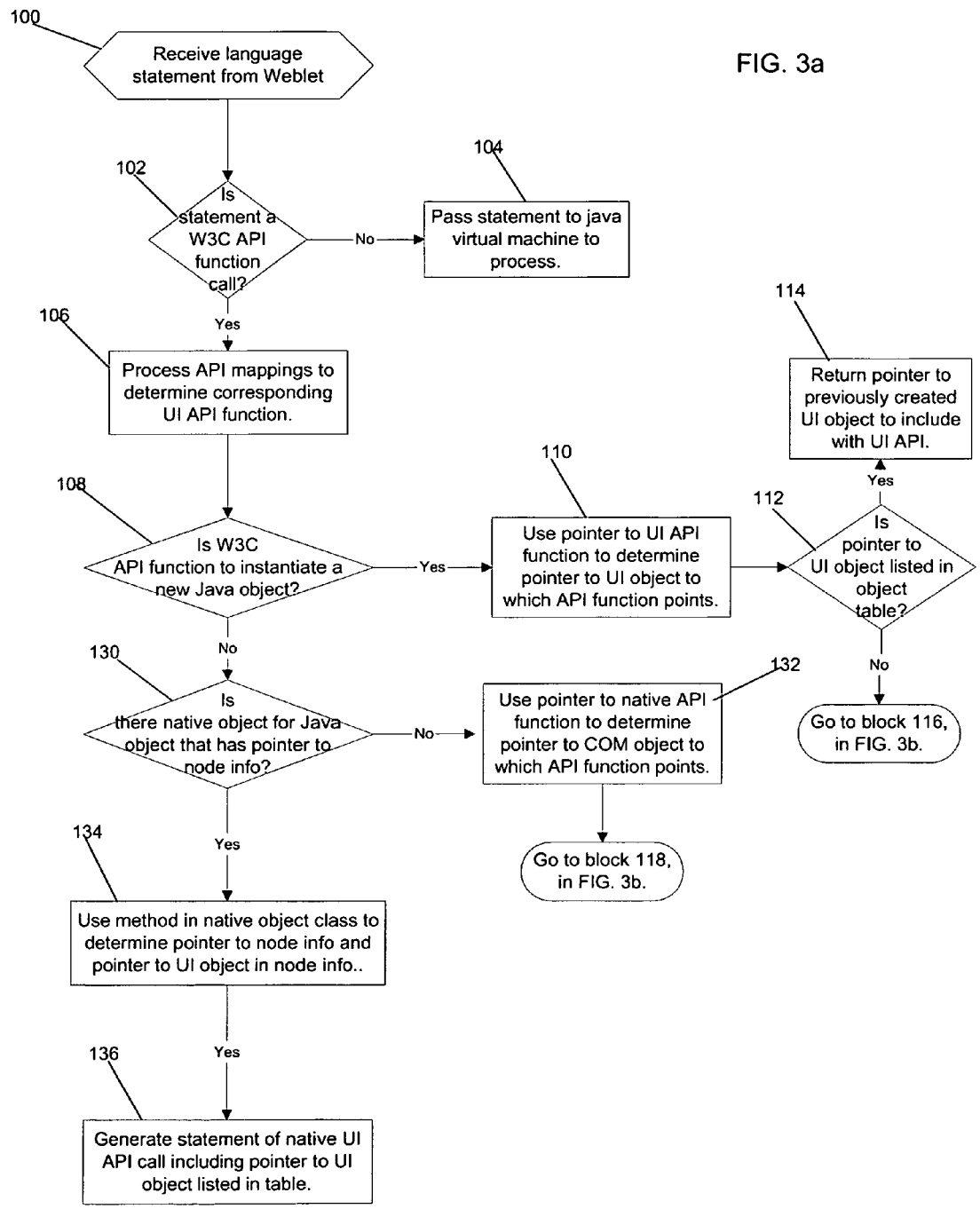
FIGS. 3a, b illustrate logic to transform Java program language statements to code that can be directly executed by the native operating system in accordance with preferred embodiments of the present invention.

FIGS. 3a, b illustrate logic implemented in the bridge 4 to process language statements in the mixed statement programs 2a, b, c. Control begins at block 100 with the bridge 4 receiving a language statement in one mixed statement program 2a, b, c. The bridge 4 determines (at block 102) whether the statement is a W3C API function call for which there is an API mapping 8. If not, then the bridge 4 passes (at block 104) the statement to the Java virtual machine 22 to transform to native machine code, i.e., bytecodes. Otherwise, the bridge 4 processes (at block 106) the API mappings 8 to determine the corresponding user interface API 12 function call, which may comprise the GUID of the API function call. If the UI API 12 function is to instantiate a new UI object 14 (at block 108), then the bridge 4 uses (at block 110) the pointer to the API function call to determine the pointer to the UI 14 object in a manner known in the art. The bridge 4 then determines (at block 112) whether the pointer to the UT object 14 is listed in the object table 18. If so, the bridge 4 returns (at block 114) the pointer to the UI object 14 listed in the object table 18 to the user interface API 12 function, and then would proceed back to block 100 to process further statements in the mixed statement program 2a, b, c. This ensures that the bridge 4 would never create UI objects 14 for the same intended object in order to maintain the uniqueness of each UT object 14. Otherwise, if there is not a pointer to the UI object 14 listed in the object table 18, then control proceeds to block 116 in FIG. 3b to generate UT APIs 12 and the accompanying linkage data structures from the corresponding Java object 30 to a new UT object 36.

Figure 3B:
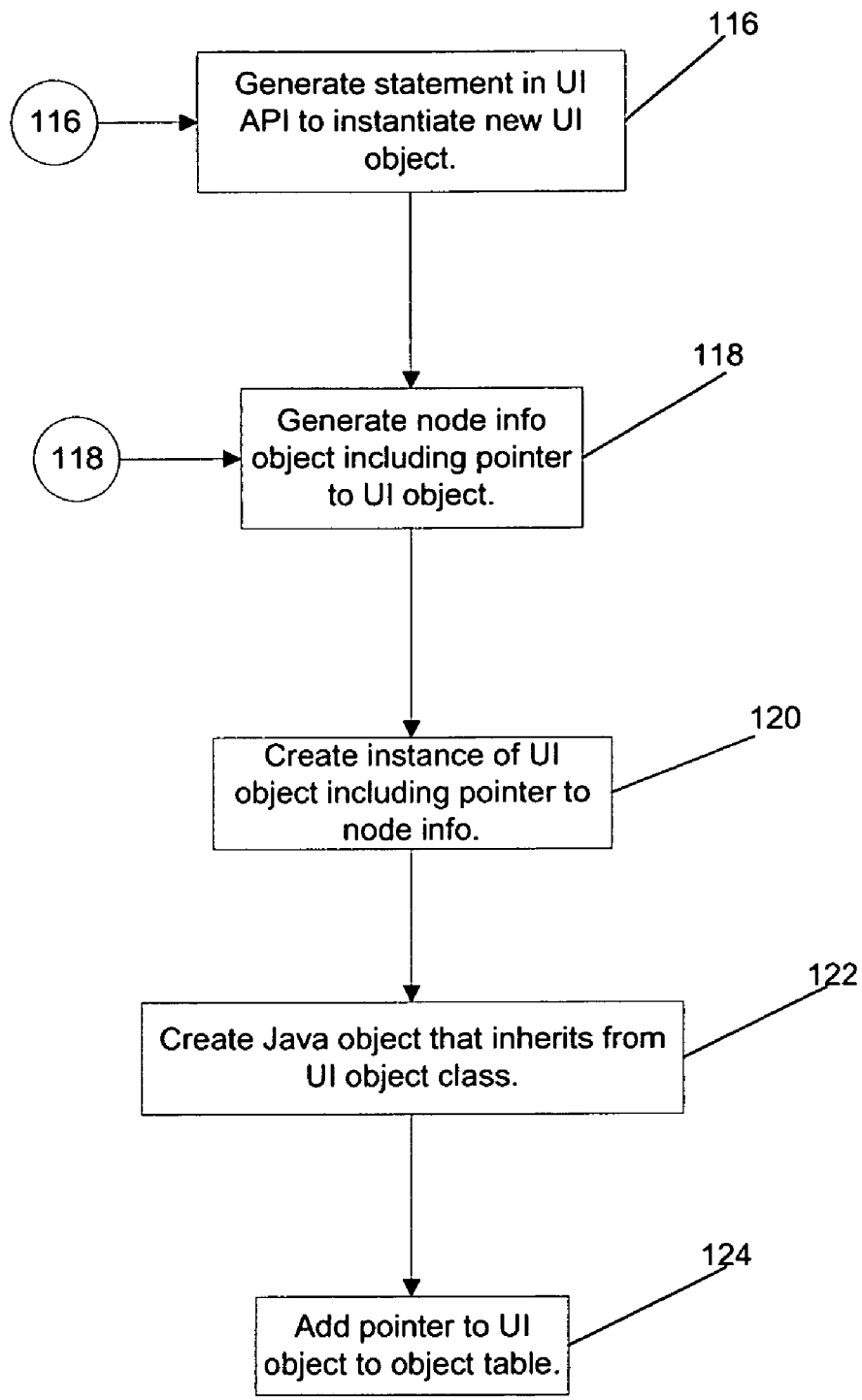

At block 116 in FIG. 3b, the bridge 4 generates the UT API function 12 to create a new instance of the UT object 14.

The bridge 4 then creates (at block 118) a node info object 34 that includes a pointer to the instantiated UT object 36. A Java user interface (UI) object 32 is created (at block 120) to implement the Java UI object class and includes a pointer to the node info object 34. The Java object specified in the W3C API function instantiating the Java object is then created and defined (at block 122) to inherit from the Java UI object class. In this way, an instance of the Java object and instances of the Java UI object 32 and node info object 34 are created to provide linkage from the Java object 30 to the corresponding UI object 36. The pointer to the new UI object 36 is then added (at block 124) to the object table 24 to ensure that additional instances of the same UI object are not created. From block 124, control would transfer back to block 100 to process any further statements in the mixed statement program 2*a*, *b*, *c*.

If, at block 108 in FIG. 3*a*, the bridge 4 determines that the W3C API function call is not to instantiate a new Java object, then the bridge 4 further determines (at block 130) whether there is a Java UI object 32 for the Java object 30 that includes a pointer to a node info object 34. If a Java UI object 32 has not yet been created for the Java object 30, then the bridge 4 uses the pointer to the UI API function 12 determined from the API mappings 8 to determine (at block 132) the pointer to the UI object 14 to which the U function interfaces. From block 132, control proceeds to block 118 in FIG. 3*b* to create the linkage data structures from the Java object 30 specified in the W3C API function call to the existing UI object 36.

If, at block 130, there is already a Java UI object 36 for the Java object 30 in the W3C API function call, then the bridge 4 uses (at block 134) a method in the Java U object class to determine the pointer to the node info object 34 from the Java UI object 32 for the Java object 30 called in the W3C API function. The functions in the Java U object class are also used to query the node info object 34 to determine the pointer to the UI object corresponding to the Java object. After obtaining the pointer to the UI object, the bridge 4 then constructs (at block 136) a statement comprising the determined user interface function call including the pointer to the UI object determined from the node info object 34, resulting in a user interface function call to a UI object.

In further embodiments, it is possible that multiple UI objects and interfaces are used to implement a single W3C class. In such case, the bridge 4 would create an additional data structure referred to as a proxy object to which the node info object points. This proxy object would in turn include pointers to multiple UI interfaces providing access to one or more UI objects that implement the W3C interface. In this way, the proxy object exposes the Java object and corresponding W3C API interface to one or more UI interfaces and objects. When processing calls to such a Java object, the bridge 4 would transform the call to the Java object to the multiple UI API interfaces specified in the proxy object to which the node info for the Java object points.

The result of the logic of FIGS. 3*a*, *b* is that the bridge transforms W3C API function calls added to mixed statement programs 2*a*, *b*, *c* to the implementation of those W3C calls in the user interface 10. Preferred embodiments exploit the fact that many current user interfaces, such as Mozilla browsers, Microsoft Internet Explorer version 5, Adobe Scalable Vector Graphics, etc., implement the W3C DOM interfaces. A program developer may then include W3C API calls in a mixed statement program also including Java language statements to directly access the user interface objects maintained in the operating system. Preferred embodiments thus allow Java developers to extend Java programs beyond the Java runtime environment and utilize existing structures and objects implemented in the operating system. This preferred embodiment computing architecture allows a Java program, such as an Applet, to be a full citizen of the operating system as the mixed statement program 2*a*, *b*, *c* can access any user interface program 10 interface and object defined in the operating system that implements a W3C API interface.

In preferred embodiments, the mixed statement programs may execute using multithreading techniques known in the art to concurrently execute multiple mixed statement programs in a single browser or web page.

Further, with the preferred embodiment architecture, the Java developer may expose data in any object accessible to the user interface, including DOM trees, to java tools. For instance, the mixed statement program may include Java Database Connectivity (JDBC) calls to perform queries to access data from a database. The program could then include W3C API interface calls to insert database records returned from the JDBC calls into the DOM for a displayed HTML page to display the returned data in the HTML page. Alternatively, the mixed statement program may call a Java Bean application to perform various calculations or operations on data, and then include W3C API interfaces to insert the results of the operation from the Java program in the HTML DOM to display in the web page.

Java and JDBC are trademarks of Sun Microsystems, Inc.; Microsoft is a registered trademark of Microsoft Corporation; OS/2 is a registered trademark of International Business Machines Corporation; Netscape is a registered trademark and Netscape Communicator, Netscape Navigator, Mozilla are trademarks of Netscape Communications Corporation.

The bridge 4 may be included in a Java Development Kit (JDK) or Java Runtime Environment (JRE) package for a specific operating system, e.g., Linux, Windows, OS/2, or any other supported operating system platform. The API mappings 8 would map each supported W3C API interface to the corresponding implementation of that interface in a user interface capable of executing on the specific operating system. In this way, the mixed statement program can execute on any operating system for which there is a aversion of the JDK or JRE including the bridge 4 and API mappings 8.

Using the W3C Interface to Manipulate the DOM

The above implementation concerned the general mapping of W3C API interfaces to user interface APIs 12 to manipulate the user interface objects 14 from a Java mixed statement program. Another aspect of the DOM is that it allows a document, or program or any component in the system to be expressed as a hierarchical relationship of objects that may separately be manipulated. Each element is maintained with attributes of the element. This allows a user to delete, add, or change an element, change its content or add, delete or change an attribute. For instance, the different parts of a document, such as sections, images, chapters, etc., may each be expressed as a DOM element in a hierarchical tree of DOM elements that define the entire document. Further, an HTML page may be expressed in a DOM tree where the elements of the HTML page, including user interface elements and program components, are expressed in a hierarchical relationship. The DOM makes all of the objects in a page, e.g., and HTML or XML page, such as images, forms, and even CSS properties, accessible to an application program. Various W3C API functions are available for manipulating DOM objects arranged in a hierarchical relationship. By manipulating particular DOM objects of an HTML page using W3C API interfaces or their corresponding implementation in a particular web browser or operating system, the user may specifically alter particular sections of the HTML page by manipulating the element(s) without affecting other sections of the HTML page defined in other elements.

Currently, the DOM is widely accepted as a standard for defining components within documents and applications, especially those related to the Internet, such as XML and HTML documents. In fact Microsoft Explorer 5.0 and Mozilla implement HTML using the DOM model and APIs. Further details of expressing document and application components in a DOM tree are described in the DOM specifications incorporated by reference above.

With the preferred embodiment bridge 4, a developer may use W3C API interfaces to implement the elements of a program or document, e.g., web browser, HTML page, user interface, etc., in a DOM tree and control the user interface through W3C API interfaces that manipulate the nodes of the DOM that implement the user interface. The W3C includes specific API interfaces to access, manipulate, create, modify and destroy node elements in a DOM tree. In such case, the API mappings 8 would include mappings for W3C API interfaces to access and manipulate nodes in a DOM tree to the corresponding command in the underlying browser or native operating system. In this way, the program developer may insert W3C API interfaces in a mixed statement program to manipulate a DOM implemented by the user interface program 10, which the bridge 4 would transform to API interfaces in the user interface program 10.

With the preferred embodiment architecture, the program developer can access the browser layout engine to generate the user interface for a program written in a different program language, such as Java. This allows the program developer to "draw" the user interface using use the HTML browser on the user's system to provide a user interface that has the same "look-and-feel" presented by the installed browser. Moreover, by using the APIs of the browser, the bridge 4 does not have to be capable of providing the transformation to native operating system machine code as all such transformations are handled by the web browser's layout engine. Such implementations of the bridge to interface with the browser engine frees the Java programmer from the Java "look-and-feel" and the limitations of the Java AWT and Swing kits. With preferred embodiments, the look-and-feel of the mixed statement program would have the same user interface and look-and-feel of the browser already installed on the user's system.

With the preferred embodiments, a program developer may write the user interface using the W3C API interfaces related to HTML and the program logic in Java. Using the W3C interfaces, the mixed statement program could include event listeners to modify the HTML page upon the occurrence of certain events such as user input. Another way to write the mixed statement program is to embed the program in an empty HTML page in a manner similar to a Java Applet. During runtime, the mixed statement program embedded in a Web page like an Applet may dynamically add buttons, tables, text and graphics to the HTML page by manipulating the HTML DOM. Still further, the mixed statement program may include a combination of preconstructed HTML elements for the user interface as well as adding elements by manipulating the DOM. Yet further, the program can be written to run as a standalone application, using the HTML elements to generate a separate GUI window, like any other operating system window. In such case, the mixed statement program may utilize the browsers engine to generate the user interface without necessarily having the look and feel of a typical HTML page, including the browser chrome.

In preferred implementations, the bridge 4 including its API mappings would be implemented in different packages to interface with different operating system platforms. Thus, the Bridge may be included in the JRE and JDK kits for each operating system platform that supports Java to map the W3C API interfaces to the native operating system API interfaces. Further, the bridge may be implemented in the Java code included with Java enabled browsers to map the W3C APIs to the API interfaces used by the browser engine. This would allow a user to download a mixed statement program through the web browser and execute the mixed statement program in the web browser. The executing mixed statement program, through the Bridge, would issue W3C API calls that are mapped to the corresponding browser implementation of those calls. The browser layout engine would then directly execute the mapped API calls to generate the user interface and manipulate components.

Using W3C APIs to Manipulate a Remote DOM

Figure 4:
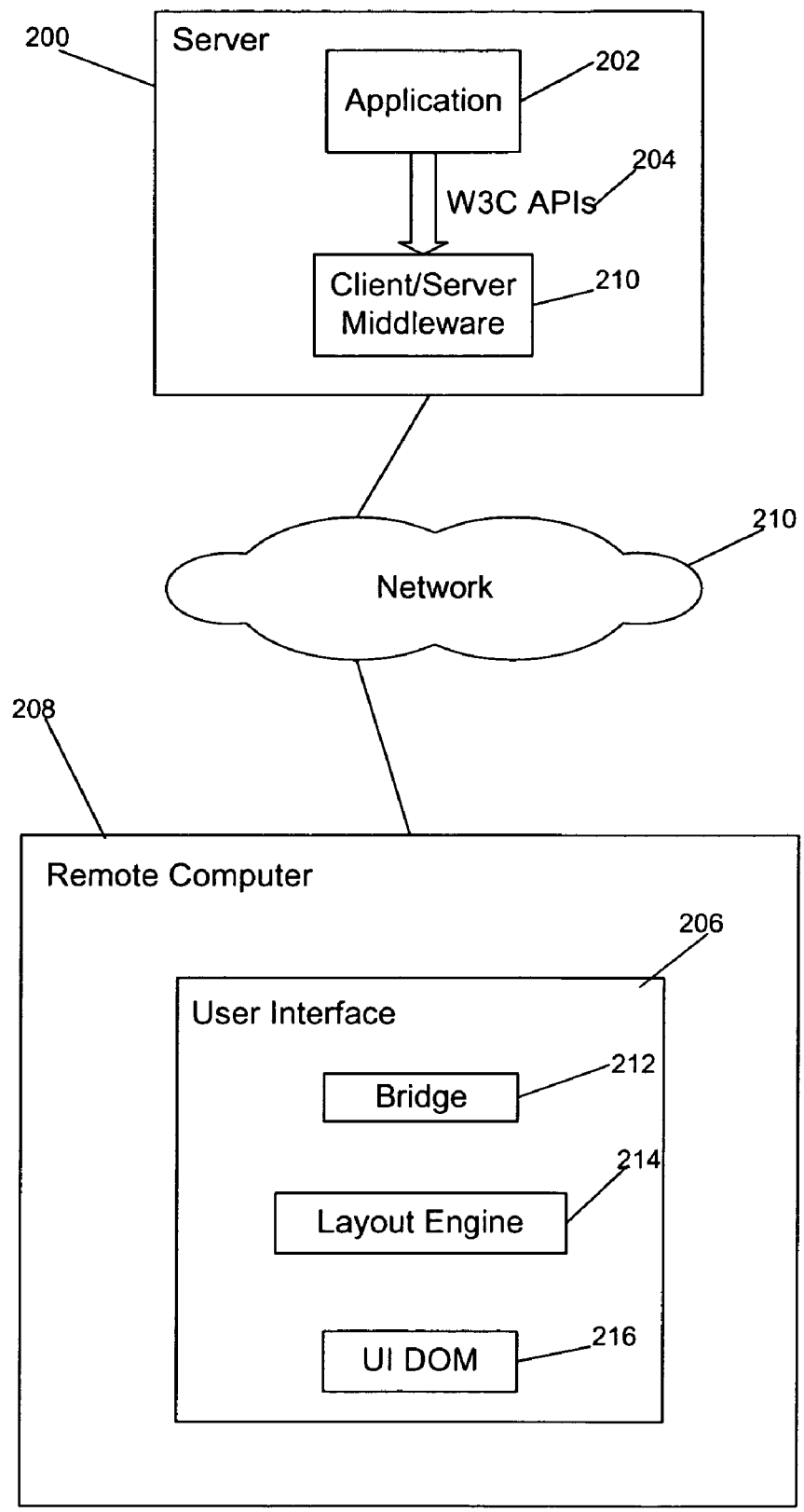
FIG. 4 illustrates the computer architecture of the preferred embodiments implemented in a client/server network environment in accordance with preferred embodiments of the present invention.

In the above embodiments, the program generating the W3C APIs and the bridge that translates the W3C APIs were described as located on the same computing system. FIG. 4 illustrates an alternative embodiment where a server 200 includes an application program 202 that generates W3C API calls 204 to control a user interface program 206 on a remote computer 208 over a network 210, such as the Internet, an Intranet, a local area network (LAN), etc. The server 200 further includes client/server middleware 210, such as the Common Object Request Broker Architecture (CORBA) to transmit the W3C API calls 204 to one or more remote computers 208 over the network 210. Alternatively, the client/server middleware 210 may comprise any other protocol or specification for allowing an application program on a server to communicate with a remote user interface, such as the Common Gateway Interface (CGI), Java Servlets, etc. Further, in preferred embodiments, the client/server middleware 210 would also include a Hypertext Transfer Protocol (HTTP) agent to allow the server 200 to respond to general HTTP requests from the remote user interface 206, which in preferred embodiments is an HTML web browser.

Both the server computer 200 and remote computers 208 may comprise any computing device known in the art, such as a server class machine, personal computer, workstation, mainframe, laptop, hand held computer, palm computing device, appliance with embedded web technology, etc. Thus, the server computer 200 is not necessarily limited to server class machines.

In preferred embodiments, the user interface 206 includes a bridge 212, including the architecture of the bridge 4 described above, to translate W3C API 204 calls from the server 200 to user interface (UI) APIs to control a layout engine 214 in the user interface 206, that in turn manipulates a user interface (UI) DOM 216. The bridge 212 may be part of the Java classes implemented in the user interface 206. Alternatively, the bridge 212 may be located external to the user interface 206. In preferred embodiments, all the components and data for the displayed user interface, such as an HTML page, is implemented in a DOM tree. The layout engine 214 would control what is displayed by manipulating the nodes of the UI DOM 206, in which the user interface elements and data are maintained.

In preferred embodiments, the application 202 includes W3C API calls 204 to manipulate the user interface (UI) DOM 206. The remote bridge 212 would then translate these standard W3C API calls 204 to the UI APIs used by the layout engine 214 to control the layout engine 214 to manipulate the UI DOM 216. The layout engine 214 would then process the UI DOM 216 objects to generate the display of the user interface.

Figure 5:
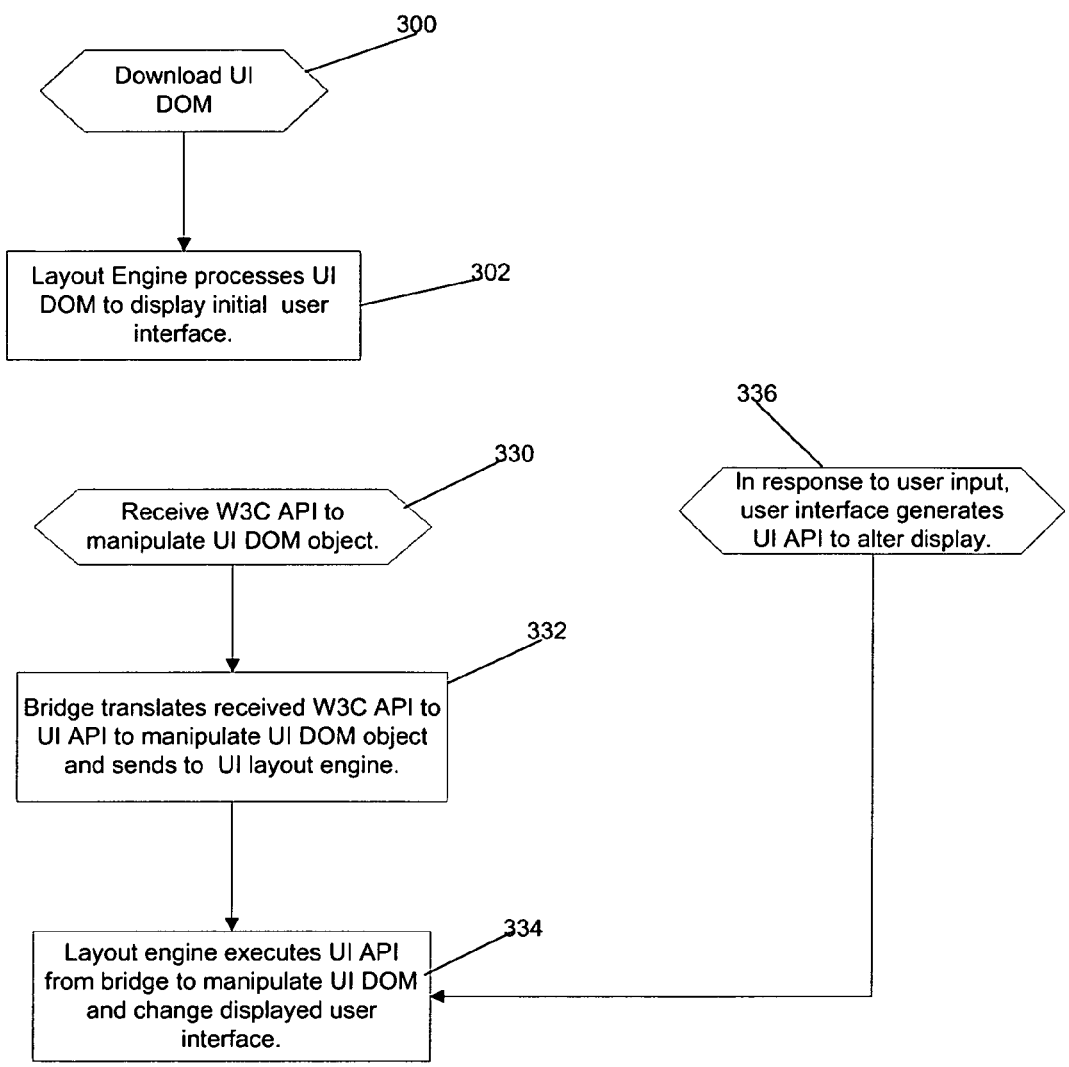
FIG. 5 illustrates operations performed in a client computer to generate user interface output in accordance with preferred embodiments of the present invention.

FIG. 5 illustrates the flow of operations at the remote computer 208 to interact with the remote server 200. Control begins at block 300 with the remote computer 208 downloading the user interface (UI) DOM 216. This could occur in response to the user interface 206 issuing an HTTP GET request for a universal resource locator (URL) at the server 200 of the server "Home" page or in response to a user selection of a hypertext link to view certain subject matter. The layout engine 214 then generates (at block 302) an initial user interface from the downloaded UI DOM 216, such as an initial HTML page or any other DOM user interface.

At block 330, the remote computer 208 receives W3C APIs 204 transmitted over the network 210 from the server 200. The bridge (at block 332) then translates the W3C APIs 204 to one or more user interface (UI) APIs that implement the W3C APIs 204 within the user interface 206. For instance, the user interface (UI) APIs may comprise the user interface implementation of the DOM, such as the particular implementation of the DOM in Microsoft Internet Explorer 4.0, Netscape Communicator 6.0 and Navigator, Mozilla, the Scalable Vector Graphics format or any other user interface that implements the DOM specification. The layout engine 214 (at block 334) then executes the user interface (UI) APIs translated from the W3C APIs 204 to manipulate the UI DOM 216 and generate commands to alter the displayed user interface, e.g., HTML page.

Alternatively, at block 336, the user interface 206 may receive user input or events to control the displayed user interface. In response, the user interface 206 would generate the appropriate UI APIs to manipulate the UI DOM 216 and generate commands to alter the displayed user interface. Thus, with the preferred embodiments, a user at the remote computer 208 may alter the displayed user interface by manipulating the UI DOM 216 locally without having to transmit a user selection to the server 200 over the network to obtain a new web page.

For instance, with prior art web browsers, if the user wants to view further information, the web browser must transmit the request for the new view or information to the server 200. With the preferred embodiments, the remote computer 208 downloads a UI DOM 216 that includes nodes of all possible displays, i.e., all the possible views of information, images, movies, graphics, etc. that the user would select from the initial page. Thus, if the user selects a hypertext link or hypertext portion of an image, the user interface 206 would generate user interface (UI) APIs to direct the layout engine 214 to manipulate the DOM 216 to perform the action requested by the user, e.g., display the file, image or graphic addressed by the hypertext link. In this way, the user may modify an HTML page and embedded objects to display entirely different views without having to consume network bandwidth, experience transmission delays, and place further loads and burdens on the server 200.

FIG. 6 illustrates the flow of operations in the server 200. Control begins at block 350 with the client/server middleware 210, such as an HTTP server component, receiving a request for the UI DOM 216 from the user interface 206. In response the client/server middleware 210 would transmit the complete UI DOM 216 to the remote computer 208.

At block 370, the application 202 receives user input from an input device (not shown) attached to the server 200. In response, the application 202 would process (at block 372) the received input and generate output which affects the UI DOM 216. The application 202 would then generate (at block 374) the W3C API calls 204 to implement the manipulation of the UI DOM 216 specified by the received input. The client/server middleware 210 would then transmit (at block 376) the generated W3C APIs 204 to one or more remote computers 208. These transmitted W3C APIs 204 would, in turn, instruct the layout engine 214 to manipulate the UI DOM 216 and modify the displayed user interface at the remote computer 208.

At block 390, the client/server middleware 210 receives input or an event transmitted from the remote user interface 206 over the network 210. In response, the client/server middleware 210 would transmit (at block 392) the received input to the application 202. The application 202 would then process (at block 394) the input and generate output, which, in turn, may cause W3C APIs 204 to be generated and transmitted to the user interface program 206.

With the preferred embodiments, the server 200 may alter the displayed user interface at the remote computer 208 without having to transmit the actual data, such as images, text, etc., which can consume significant network bandwidth. Instead, the application 202 just transmits W3C API commands, which consume relatively insignificant bandwidth, to the user interface(s) 206, which process the W3C APIs 204 to manipulate the UI DOM 216 to control the user interface displayed at the remote computer 208.

The preferred embodiment remote architecture may be used to allow a user at the server 200 to interact with and control the displayed user interface at the remote computer 208. For instance, an automobile salesperson may use the application 202 to transmit to a remote computer, operated by a customer, a UI DOM that includes images of an automobile. The UI DOM may cause the user interface 206 to alert the application 202 when the customer is viewing the automobile generated by the UI DOM. When the salesperson is alerted, the salesperson may send a message to the remote user interface 206 requesting the customer to participate in an on-line sales presentation of the displayed automobile. If the customer accepts, then the salesperson at the application 202 may manipulate the UI DOM to cause different views of the automobile to be displayed at the customer computer. These manipulations by the salesperson of the UT DOM 216 with the application 202 would generate W3C APIs to implement the manipulations of the UI DOM, which would then be transmitted to the customer user interface 206 over the network 210. The user interface 206 bridge 212 would then translate the W3C APIs to user interface (UI) APIs that the layout engine 214 would execute to manipulate the UI DOM 216 to alter the view of the vehicle according to the input from the salesperson using the application 202. This process may apply to the demonstration or sale of any goods or items.

In this way, a person at a remote server 200 may manipulate the user interface (UT) DOM at a remote computer to control what is displayed by the remote user interface 206. The preferred embodiments are particularly advantageous because the application 202 may be used to manipulate a common user interface, such as a Web browser, over the Internet 210, thereby enhancing on-line marketing of products over the Internet. Further, with the preferred embodiments, network transmission delays are minimized because the salesperson at the server 200 is only transmitting W3C APIs 204, which consumes substantially less network bandwidth than data transmissions, such as images, graphics, and text.

The preferred embodiments may also be used for interactive education. For example, each student would have a remote computer 208 and download the user interface (UT) DOM 216 that would have all parts of the interactive lesson. A teacher at the server 200 would use the application 202 to manipulate the user interface (UT) DOM 216 to proceed through an interactive lesson. In response, the application 202 would generate W3C APIs 204 to implement the actions taken by the teacher using the application 202, such as selecting an image to display, marking-up an image, writing text in a text area, etc., and the client/server middleware 210 would transmit those W3C APIs 204 to all student remote computers 208 participating in the lesson. Again with the preferred embodiments, the teacher at the server 200 may control the images, text, or any other material, such as movies and sound files, presented to the user through the user interface 206 by manipulating the user interface (UI) DOM 216 at the remote computer 208.

Still further, a user, such as a student, at the remote computer 208 may enter user input to the user interface 206 to manipulate the user interface (UI) DOM 216 to alter the displayed user interface and transmit the user input to the application 202 over the network 210. The application 202 may then process the user input from the remote student computer to manipulate the user interface DOM at the server 200 end to allow the teacher to observe the changes the student made and generate W3C APIs 204 to implement the student alterations to the user interface. The client/server middleware 210 may then transmit the W3C APIs 204 implementing manipulations of the UI DOM 216 performed by the student to all other remote computers participating in the lesson or on-line activity.

With the preferred embodiment architecture, a user at a remote server may control what is displayed in the user interface of one or more remote computers by issuing commands using a standard interface protocol, such as the W3C APIs. Because each of the remote computers includes a bridge to translate the W3C APIs to the APIs used by the user interface to manipulate a user interface (DOM), the server may control multiple user interfaces from different vendors with the same W3C API commands. The only requirement is that the user interface program 206 implement the DOM specification and include a bridge capable of translating W3C APIs from the application 202 to a user interface (UI) specific API that the layout engine of the user interface can execute. Further, the application 202 must provide a user interface (DOM) that is compatible with the user interface program's implementation of the DOM. Thus, the application 202 may provide different user interface (UI) DOMs for different user interfaces. For instance, the users at the remote computers 208 would select a UI DOM for their particular web browser or user interface, e.g., Microsoft Explorer, Netscape Communicator, etc., and the server 200 would provide the user interface specific implementation of the user interface UI) DOM 216.

ALTERNATIVE EMBODIMENTS AND CONCLUSIONS

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred implementations, the W3C API interfaces are provided and mapped to corresponding API interfaces in the user interface in which the mixed statement program will execute. However, alternative embodiments may allow the use of standard API interfaces other than W3C. For instance, if another set of API interfaces, not those proposed by W3C, is adopted industry wide, then the Bridge may provide mappings from those alternative industry standard API interfaces to the implementation of those standard APIs in a native operating system or web browser. In this way, the present invention for mapping standard interfaces may apply to allow the Java developer to utilize the API interface standards to access non-Java components in the operating system.

In preferred embodiments, the mixed statement programs include Java programming language statements, which are capable of being implemented on different operating system platforms. In further embodiments, the mixed statement programs may include code from other computer languages as well as alternative cross-platform languages other than Java. In such case, the preferred embodiments provide a methodology for extending standard API interfaces to programs to allow the developer to utilize the standard API interfaces to enhance the capabilities of the program and program language being used. With preferred embodiments, the programmer may write one application program or mixed statement program including code in the cross-platform computer language and include the industry standard API interfaces, and then use implementations of the bridge to allow the program to execute on different operating system through the browser layout engine.

Preferred embodiments described the user interface as a graphical user interface, such as a web browser. However, the user interface may be in any human observable format, such as voice interface, wherein the code in the mixed statement program generates voice commands.

In non-Java implementations, a virtual machine program may be provided to translate the application program to code that is independent of the operating system platform, and then transform the operating system independent bytecodes to native operating system object code.

The bridge may be implemented in a JDK kit including the Java virtual machine. The Java Virtual Machine may be provided as a software kit that is installed as an application program or embedded in a ROM or flash memory.

Preferred embodiments described the bridge mapping W3C API interfaces to corresponding interfaces in Mozilla browsers and the Microsoft Internet Explorer 5. However, there may be further implementations of the bridge to provide API for any browser that implements aspects of the W3C DOM standard, including DOM level 1, all of the W3C HTML 4.0, and parts of the DOM level 2, including the CORE, HTML, Events, StyleSheets, and Cascading Style Sheets.

Preferred embodiments were described with respect to using the W3C API interfaces to access user interface objects, such as COM and XPCOM objects, which is the format of component objects in the Internet Explorer and Mozilla browser user interfaces, respectively. However, the bridge may map the W3C API interfaces to interfaces in any supported user interface program to access the objects in the format for that user interface. For instance, the bridge 4 may be used to interface with objects in the IBM System Object Model (SOM) format.

Mixed statement programs may be executed on any computing device that is capable of executing the bridge to transform the mixed statement code to either the native operating system code used by the computing device or the user interface APIs 12 and objects 14.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

In the preferred embodiment shown in FIG. 4, the object and W3C API commands are described as initiating from the same server 200. However, in further embodiments, the object and W3C API commands may come from multiple servers or computers.

Preferred embodiments were described with respect to the W3C API commands originating from a server. However, the invention is not limited to a client/server environment. In alternative embodiments, computers in a peer-to-peer relationship may communicate W3C APIs to affect the user interface (UI) objects and generated user interface output on remote peers.

In summary, the present invention provides a system, method, and program for generating user interface output on an output device attached to a remote computer. The remote computer communicates over a network to at least one server. The remote computer and server may comprise any computing device known in the art or any appliance or device including an embedded computing device. An object is transmitted to the remote computer including user interface components and data. The remote computer generates user interface output from the user interface components and data in the object. The computer further transmits to the remote computer standard application program interfaces (API) that are a member of a set of standard APIs in a first format. The remote computer converts the standard APIs in the first format to user interface APIs in a second format to manipulate the object and generate further user interface output from the components and data in the object.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating user interface output on an output device attached to a remote computer, wherein the remote computer communicates over a network to at least one server, comprising:

receiving an object including user interface components and data from one server;

generating user interface output from the user interface components and data in the object, wherein the user interface output generates a web browser interface;

receiving standard application program interfaces (API) that are a member of a set of standard APIs in a first format from at least one server over the network;

converting the standard APIs in the first format to a user interface API in a second format;

executing the user interface APIs in the second format to manipulate the object and generate further user interface output from the components and data in the object, wherein the user interface output is controlled by the at least one server through the standard APIs sent by the at least one server over the network;

receiving user input commands at the remote computer;

generating user interface APIs in the second format to implement the user input commands; and executing the generated user interface APIs to manipulate the object and generate further user interface output from the components and data in the object.

2. The method of claim 1, wherein the data included in the object includes at least one of text, images, and graphics.

3. The method of claim 1, wherein the object comprises a document object model (DOM) object and the standard APIs in the first format comprise W3C APIs.

4. A method for controlling from a server user interface output on an output device attached to a remote computer, wherein the server and remote computer communicate over a network, comprising:

transmitting from the server an object to the remote computer including user interface components and data, wherein the remote computer generates user interface output from the user interface components and data in the object, wherein the user interface output generates a web browser interface;

transmitting from the server to the remote computer standard application program interfaces (API) that are a member of a set of standard APIs in a first format, wherein the remote computer converts the standard APIs in the first format to user interface APIs in a second format to manipulate the object and generate further user interface output from the components and data in the object, wherein the user interface output at the remote computer is controlled by the server through the standard APIs sent by the server over the network;

generating a user interface at the server from a copy of the object transmitted to the remote computer;

receiving input to control the user interface at the server;

generating standard APIs in the first format to control the user interface according to the received input; and transmitting the generated standard APIs in the first format to the remote computer to control the user interface output generated at the remote computer.

5. The method of claim 4, wherein the object includes images of a product, wherein the received input at the server is to modify the presentation of the images of the product, and wherein the generated and transmitted standard APIs modify the presentation of the images of the product displayed in the generated user interface output at the remote computer.

6. The method of claim 4, further comprising:
transmitting the object to additional remote computers;
transmitting the standard APIs in the first format to the additional remote computers that received the object to manipulate the objects on all the remote computers and control the generation of user interface output on the remote computers.

7. The method of claim 6, further comprising:
receiving, at the server, input from one of the remote computers to manipulate the object to modify the user interface output;
generating, with the server, standard APIs to implement the manipulations to the object indicated in the received input; and
transmitting the generated standard APIs to the remote computers to implement the manipulations of the object on the remote computers.

8. The method of claim 6, wherein the object includes components and data of an interactive lesson, wherein the lesson is presented by transmitting standard APIs to the remote computers to generate user interface output defining the lesson from the components and data in the object at each remote computer.

9. The method of claim 4, wherein the data included in the object includes at least one of text, images, and graphics.

10. The method of claim 4, wherein the object comprises a document object model (DOM) object and the standard APIs in the first format comprise W3C APIs.

11. A system for generating user interface output, comprising:
a remote computer;
an output device attached to the remote computer;
a network, wherein the remote computer communicates over the network to at least one server;
program logic executed in the remote computer, wherein the program logic includes code capable of causing the remote computer to perform:
(i) receiving an object including user interface components and data from one server;
(ii) generating user interface output from the user interface components and data in the object, wherein the user interface output generates a web browser interface;
(iii) receiving standard application program interfaces (API) that are a member of a set of standard APIs in a first format from at least one server over the network;
(iv) converting the standard APIs in the first format to a user interface API in a second format;
(v) executing the user interface API in the second format to manipulate the object and generate further user interface output from the components and data in the object, wherein the user interface output is controlled by the at least one server through the standard APIs sent by the at least one server over the network;
(vi) receiving user input commands at the remote computer;
(vii) generating user interface APIs in the second format to implement the user input commands; and
(viii) executing the generated user interface APIs to manipulate the object and generate further user interface output from the components and data in the object.

12. The system of claim 11, wherein the data included in the object includes at least one of text, images, and graphics.

13. The system of claim 11, wherein the object comprises a document object model (DOM) object and the standard APIs in the first format comprise W3C APIs.

14. A system for controlling user interface output on an output device attached to a remote computer, comprising:
a server;
a network, wherein the server communicates with the remote computer over the network;
program logic executed in the server, wherein the program logic includes code capable of causing the server to perform:
(i) transmitting an object to the remote computer including user interface components and data, wherein the remote computer generates user interface output from the user interface components and data in the object, and wherein the user interface output generates a web browser interface; and
(ii) transmitting to the remote computer standard application program interfaces (API) that are a member of a set of standard APIs in a first format, wherein the remote computer converts the standard APIs in the first format to user interface APIs in a second format to manipulate the object and generate further user interface output from the components and data in the object, wherein the user interface output at the remote computer is controlled by the server through the standard APIs sent by the server over the networks;
(iii) generating a user interface at the server from a copy of the object transmitted to the remote computer;
(iv) receiving input to control the user interface at the server;
(v) generating standard APIs in the first format to control the user interface according to the received input; and
(vi) transmitting the generated standard APIs in the first format to the remote computer to control the user interface output generated at the remote computer.

15. The system of claim 14, wherein the object includes images of a product, wherein the received input at the server is to modify the presentation of the images of the product, and wherein the generated and transmitted standard APIs modify the presentation of the images of the product displayed in the generated user interface output at the remote computer.

16. The system of claim 14, wherein the program logic code is further capable of causing the server to perform:
transmitting the object to additional remote computers; and
transmitting the standard APIs in the first format to the additional remote computers that received the object to manipulate the objects on all the remote computers and control the generation of user interface output on the remote computers.

17. The system of claim 16, wherein the program logic code is further capable of causing the server to perform:
receiving input from one of the remote computers to manipulate the object to modify the user interface output;
generating standard APIs to implement the manipulations to the object indicated in the received input; and
transmitting the generated standard APIs to the remote computers to implement the manipulations of the object on the remote computers.

18. The system of claim 16, wherein the object includes components and data of an interactive lesson, wherein the lesson is presented by transmitting standard APIs to the remote computers to generate user interface output defining the lesson from the components and data in the object at each remote computer.

19. The system of claim 14, wherein the data included in the object includes at least one of text, images, and graphics.

20. The system of claim 14, wherein the object comprises a document object model (DOM) object and the standard APIs in the first format comprise W3C APIs.

21. A program for use in generating user interface output on an output device coupled to a remote computer, wherein the remote computer communicates over a network to at least one server, and wherein the program is embedded in a computer readable storage device and includes code capable of causing the remote computer to perform:
  receiving an object including user interface components and data from one server;
  generating user interface output from the user interface components and data in the object, wherein the user interface output generates a web browser interface;
  receiving standard application program interfaces (API) that are a member of a set of standard APIs in a first format from at least one server over the network;
  converting the standard APIs in the first format to a user interface API in a second format;
  executing the user interface APIs in the second format to manipulate the object and generate further user interface output from the components and data in the object, wherein the user interface output is controlled by the at least one server through the standard APIs sent by the at least one server over the network;
  receiving user input commands at the remote computer;
  generating user interface APIs in the second format to implement the user input commands; and
  executing the generated user interface APIs to manipulate the object and generate further user interface output from the components and data in the object.

22. The program of claim 21, wherein the data included in the object includes at least one of text, images, and graphics.

23. The program of claim 21, wherein the object comprises a document object model (DOM) object and the standard APIs in the first format comprise W3C APIs.

24. A program for controlling a server to generate user interface output on an output device attached to a remote computer, wherein the server and remote computer communicate over a network, and wherein the program is embedded in a computer readable storage device and includes code capable of causing the server to perform:
  transmitting an object to the remote computer including user interface components and data, wherein the remote computer generates user interface output from the user interface components and data in the object, and wherein the user interface output generates a web browser interface; and
  transmitting to the remote computer standard application program interfaces (API) that are a member of a set of standard APIs in a first format, wherein the remote computer converts the standard APIs in the first format to user interface APIs in a second format to manipulate the object and generate further user interface output from the components and data in the object, wherein the user interface output at the remote computer is controlled by the server through the standard APIs sent by the server over the network;
  generating a user interface at the server from a copy of the object transmitted to the remote computer;
  receiving input to control the user interface at the server;
  generating standard APIs in the first format to control the user interface according to the received input; and
  transmitting the generated standard APIs in the first format to the remote computer to control the user interface output generated at the remote computer.

25. The program of claim 24, wherein the object includes images of a product, wherein the received input at the server is to modify the presentation of the images of the product, and wherein the generated and transmitted standard APIs modify the presentation of the images of the product displayed in the generated user interface output at the remote computer.

26. The program of claim 24, wherein the program code is further capable of causing the server to perform:
  transmitting the object to additional remote computers; and
  transmitting the standard APIs in the first format to the additional remote computers that received the object to manipulate the objects on all the remote computers and control the generation of user interface output on the remote computers.

27. The program of claim 26, wherein the program code is further capable of causing the server to perform:
  receiving input from one of the remote computers to manipulate the object to modify the user interface output;
  generating standard APIs to implement the manipulations to the object indicated in the received input; and
  transmitting the generated standard APIs to the remote computers to implement the manipulations of the object on the remote computers.

28. The program of claim 26, wherein the object includes components and data of an interactive lesson, wherein the lesson is presented by transmitting standard APIs to the remote computers to generate user interface output defining the lesson from the components and data in the object at each remote computer.

29. The program of claim 24, wherein the data included in the object includes at least one of text, images, and graphics.

30. The program of claim 24, wherein the object comprises a document object model (DOM) object and the standard APIs in the first format comprise W3C APIs.

* * * * *